United States Patent
Haynes

[11] Patent Number: 6,118,882
[45] Date of Patent: Sep. 12, 2000

[54] COMMUNICATION METHOD

[76] Inventor: Philip Ashley Haynes, 46 Sandringham Court, Maida Vale London W9, United Kingdom

[21] Appl. No.: 08/913,046

[22] PCT Filed: Jan. 25, 1996

[86] PCT No.: PCT/GB96/00167

§ 371 Date: Aug. 19, 1997

§ 102(e) Date: Aug. 19, 1997

[87] PCT Pub. No.: WO96/23373

PCT Pub. Date: Aug. 1, 1996

[30] Foreign Application Priority Data

| Jan. 25, 1995 | [GB] | United Kingdom | 9501408 |
| Mar. 29, 1995 | [GB] | United Kingdom | 9506448 |
| Nov. 3, 1995 | [GB] | United Kingdom | 9522535 |

[51] Int. Cl.[7] ............................ H04R 25/00
[52] U.S. Cl. .............. 381/374; 128/420.5; 128/420.6; 455/269; 455/100; 600/25; 381/326; 381/315; 381/151
[58] Field of Search ........................ 600/25; 128/420.5, 128/420.6; 381/326, 316, 151, 315, 311, 309, 15, 16, 25, 71.2, 380; 455/269, 100

[56] References Cited

U.S. PATENT DOCUMENTS

| 3,629,521 | 12/1971 | Puharich et al. ................ 381/151 |
| 4,067,342 | 1/1978 | Burton . |
| 4,440,160 | 4/1984 | Fischell et al. . |
| 4,845,751 | 7/1989 | Schwab ................ 381/25 |
| 4,901,355 | 2/1990 | Moore . |
| 5,012,520 | 4/1991 | Steeger . |
| 5,095,382 | 3/1992 | Abe ................ 359/189 |
| 5,247,293 | 9/1993 | Nakagawa ................ 340/825.25 |
| 5,265,168 | 11/1993 | Schiess et al. . |
| 5,491,507 | 2/1996 | Umezawa et al. ................ 348/14 |
| 5,579,400 | 11/1996 | Ballein . |
| 5,608,808 | 3/1997 | Da Silva ................ 381/183 |
| 5,724,667 | 3/1998 | Furuno ................ 455/575 |
| 5,815,579 | 3/1995 | Boyden ................ 381/301 |

FOREIGN PATENT DOCUMENTS

| 0 362 611 | 4/1990 | European Pat. Off. . |
| 0 457 492 | 11/1991 | European Pat. Off. . |
| 0 579 238 | 1/1994 | European Pat. Off. . |
| 1 563 892 | 4/1969 | France . |
| 2 701 616 | 8/1994 | France . |
| 29 07 570 | 8/1980 | Germany . |
| 29 38 584 | 4/1981 | Germany . |
| 86 17 136 U | 6/1986 | Germany . |
| 57-44276 | 3/1982 | Japan . |
| 57-160436 | 10/1982 | Japan . |
| 60-250731 | 12/1985 | Japan . |
| 61-46638 | 3/1986 | Japan . |
| 61-46639 | 3/1986 | Japan . |
| 3-29141 | 2/1991 | Japan . |
| 743 722 | 1/1956 | United Kingdom . |
| 1 089 238 | 11/1967 | United Kingdom . |
| 1 183 487 | 3/1970 | United Kingdom . |
| 2 043 257 | 10/1980 | United Kingdom . |
| 2 050 768 | 1/1981 | United Kingdom . |
| 2 129 176 | 5/1984 | United Kingdom . |
| 2 206 014 | 12/1988 | United Kingdom . |
| 2050768 | 5/1990 | United Kingdom .......... H04B 1/38 |
| WO 92/21307 | 12/1992 | WIPO . |

*Primary Examiner*—Stella Woo
*Assistant Examiner*—Dionne N. Harvey
*Attorney, Agent, or Firm*—Flynn, Thiel, Boutell & Tanis, P.C.

[57] ABSTRACT

Audio apparatus comprises a base unit including circuitry for generating electrical signals representing sounds and at least one earphone adapted to receive the electrical signals and to reproduce sounds represented by the signals, in which the apparatus is provided externally with a terminal arranged so that it can be positioned in use in contact with or in close proximity to the surface of the user's body. The circuitry is arranged to supply to the terminal signals which are transmitted through the user's body, the or each earphone is provided with a terminal arranged so that it can be positioned in use in contact with or in close proximity to the surface of the user's body so as to receive signals transmitted from the terminal through the user's body, and the or each earphone includes receiving circuitry arranged to receive the signals. The earphones may be embodied in a pair of spectacles, and may be adjustable between a first position behind the ear and a second position in or more adjacent the ear.

27 Claims, 9 Drawing Sheets

COMMUNICATION METHOD

FIELD OF THE INVENTION

This invention relates to a method of radio frequency communication, in particular, but not exclusively, in audio apparatus of the kind consisting of a base unit containing circuitry for generating electrical signals representing sounds and at least one earphone adapted to receive the electrical signals and to reproduce sounds represented by the signals. By earphone, we mean an electroacoustic transducer adapted-to fit in or adjacent the ear to provide sound thereto, preferably without significant emission of sound to the environment.

The invention relates particularly, but not exclusively, to portable audio apparatus of the kind often called "personal stereo" equipment, in which the base unit contains sound reproducing apparatus such as an audio cassette player, compact disc player, and/or a radio receiver. In such apparatus, the circuitry in the base unit is designed to generate audio frequency signals which are supplied to the earphones through flexible leads extending from the base unit to the earphones.

BACKGROUND OF THE INVENTION

The earphone leads of known personal stereos are unsightly and can be disadvantageous, for example if the user wishes to take part in physical exercise whilst wearing the apparatus.

It is an object of this invention to provide portable audio apparatus which avoids this disadvantage.

SUMMMARY OF THE INVENTION

According to the first aspect of the present invention there is provided a method of radio frequency communication between a transmitter and a receiver comprising disposing antenna means of the transmitter and the receiver sufficiently adjacent the body of a user for radio frequency signals to be transmitted substantially solely through the user's body from the transmitter to the receiver.

According to a second aspect of the present invention there is provided apparatus comprising a first portion and second portion physically separate therefrom, at least one of the portions being adapted to transmit radio frequency signals, at least the other portion being adapted to receive radio frequency signals, one said portion being carried by or worn on or about the body of a user of the apparatus, and having means to transmit radio frequency signals thereto at least an antenna or terminal of the other portion being disposable in contact with or adjacent the user's body so that radio frequency communication between said portion is established through the user's body.

Thus the apparatus may be audio apparatus, wherein one portion is a base unit for generating radio frequency electrical signals representing sounds and the other portion comprises an earphone and means for demodulating the radio frequency signals into audio signals to drive the earphone.

The terminal is preferably a coil. This is particularly advantageous where the terminal is located adjacent to the user's body.

According to a third aspect of the present invention there is provided audio apparatus comprising a base unit including circuitry for generating electrical signals representing sounds and at least one earphone adapted to receive the electrical signals and to reproduce sounds represented by the signals, in which the apparatus is provided externally with a first terminal arranged so that it can be positioned in use in contact with or in close proximity to the surface of the user's body, the circuitry is arranged to supply to the first terminal signals which are transmitted through the user's body, the or each earphone is provided with a further terminal arranged so that it can be positioned in use in contact with or in close proximity to the surface of the user's body so as to receive signals transmitted from the first terminal through the user's body, and the or each earphone includes receiving circuitry arranged to receive the signals.

The first terminal may be provided on a housing of the base unit.

The apparatus of this invention avoids the use of leads extending between the base unit and the earphones.

Preferably, the or each earphone includes an energy storage device (eg. a capacitor or battery) or an energy producing device (eg. a solar cell) to power the earphone circuitry, and a switch to turn off the circuit or switch it to a quiescent state when the earphone is not in use, to prevent power drain. The switch may be automatically operated by insertion of the earphone into the user's ear, for example in response to flexing of a part of the earphone used to hold the earphone in position, or in response to detection of the contact of the earphone terminal with the user's skin. Alternatively or additionally, the switch may be operated in response to the detection of the presence at the earphone terminal of an electrical signal at the appropriate carrier frequency at which the base unit transmits the signal. The base unit may include means for recharging the energy storage device. Preferably, there are means for stowing the or each earphone when not in use; said stowing means may include electrical connectors for connecting the power storage device to the recharging means.

In some circumstances, where the electrical signals received by the earphone are strong enough to power the receiving circuitry and transducer, it may be possible to dispense with the use of a battery or storage capacitor in the earphone.

The invention may be applied to personal stereo apparatus. In accordance with a preferred aspect of this invention, the apparatus includes left and right earphones, and the circuitry in the base unit is arranged to transmit left and right stereo signals suitably encoded for reception by the left and right earphones. The left and right stereo signals may for example be transmitted at different carrier frequencies.

The base unit may include a tape cassette player, CD player, radio or other sound. source in the same way as the base unit of a conventional personal stereo.

Alternatively, the apparatus of this invention may be adapted for connection to a conventional personal stereo apparatus or other source of signals, so that it can be converted to a cordless system. In this case, the base unit of the apparatus of the invention need only contain circuitry to convert the output signals of the conventional apparatus to a form suitable for transmission through the housing terminal of the unit. For example, the unit may be provided with a lead arranged to be plugged into an earphone socket of the personal stereo or other apparatus, to receive the audio frequency output signals of the personal stereo. In one embodiment, the output signals are sufficient to power the unit without the need for a separate battery in the unit.

The base unit of the apparatus of this invention may comprise a mounting or container for containing or supporting the signal source apparatus.

The circuitry of the or each earphone may be arranged to transmit electrical signals through the earphone terminal, to be received by suitable circuitry in the base unit. This may be used as a control unit, for example in the personal stereo embodiment of the invention to facilitate volume control on the base unit, or to CD track or radio station selection.

In another form of the invention, the electrical signals transmitted by the earphone may be derived from a microphone contained in or connected to the casing of the earphone and arranged to detect the user's speech. The apparatus of the invention may then be used as part of a telephone or other communication system, the base unit being connected by suitable means to a telephone network. For example, the apparatus of the invention could be used to provide an improved hands-free mobile phone unit or car phone.

The invention could also find application in other situations where conventional apparatus uses earphones or headphones connected by flexible leads to a base unit, or which use radio transmission between the base unit and the earphones, such as telephone switchboard systems, mobile speech recording and communication systems, television studio microphone and earphone communication units, conference systems and aircraft and other transport entertainment or communication systems.

Thus the base unit may be for installation in a vehicle, means being provided to connect the base unit to the vehicle whereby part thereof in contact with or proximate the user's body forms said terminal. In a motor vehicle, the steering wheel, the seats, or even the floor provide potentially suitable structures for use as the terminal.

A fourth aspect of the invention is directed to the problems associated with known earphones. These problems include for example that earphones located on a headband are bulky to store and to carry when not in use and, in use, may disturb the hair of the wearer. Earphones of the type attached to separate leads may feel insecure to the wearer and are readily pulled out of the ear if the lead is caught, for example in the user's clothing or bag.

A further problem with either arrangement is that the earphones may be awkward and uncomfortable to wear if the user wears any form of glasses, including prescription glasses to correct any sight defects, sunglasses, safety glasses, sports goggles or visors, etc. For ease of reference, the various types of glasses or other eyewear will be referred to simply as spectacles throughout the following description of the invention.

These and other problems have been overcome in this aspect of the present invention by providing spectacles which have an earphone located at the ear end of at least one arm of the spectacles; the spectacles being adapted such that they may be worn in the conventional manner with the ear ends of the arms located behind the ears or they may be worn with the earphone located in or adjacent to the ear.

Thus, in this aspect of the present invention there is provided a pair of spectacles comprising a frame for holding lenses and an arm extending from each side of the frame, the arms having a frame end and an ear end; wherein the ear end of at least one arm includes an earphone and wherein the spectacles include adjusting means for adjusting the ear end from a first position in which, when the spectacles are worn such that the frame rests on the bridge of the nose, the earphone is located behind the ear to a second position in which, when the spectacles are worn such that the frame rests on the bridge of the nose, the earphone is located in or adjacent to the ear. Both of said arms preferably include an earphone at their respective ear ends and means for adjusting the ear end from a first position to a second position.

The spectacles of this aspect of the present invention may be adapted for use with conventional audio apparatus or may be for use with audio apparatus according to the first aspect of the invention or integral sound source.

Thus, the spectacles may additionally comprise a terminal arranged so that it can be positioned in use in contact with or in close proximity to the user's body so as to receive signals transmitted from the housing terminal through the user's body, and the or each earphone includes receiving circuitry arranged to receive the signals from the base unit.

BRIEF DESCRIPTION OF THE DRAWINGS

The invention will now be described, by way of example only, with reference to the accompanying drawings, in which.

DETAILED DESCRIPTION

Figure 1:
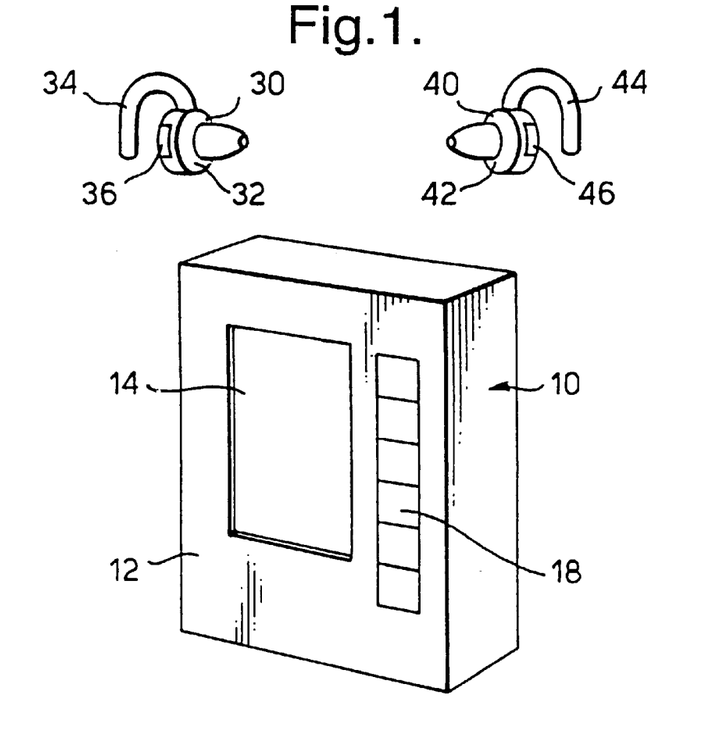
FIG. 1 is a diagrammatic illustration of personal stereo apparatus in accordance with the invention.
Figure 2:
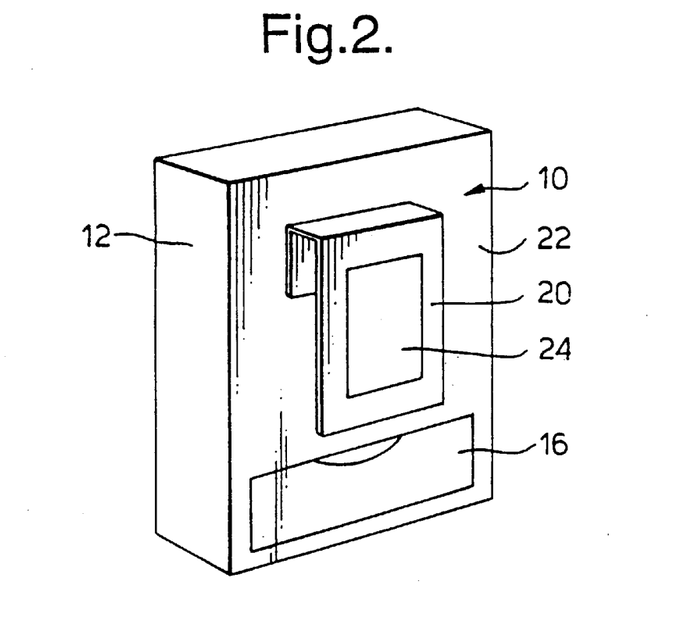
FIG. 2 is a rear view of a base unit of the apparatus of FIG. 1.

Referring to FIGS. 1 and 2, a personal stereo apparatus consists of a base unit 10 and left and right earphones 30 and 40.

The base unit 10 consists of a housing 12 containing sound reproducing apparatus such as a tape cassette player, CD player and/or radio receiver 14, or sound producing apparatus a battery compartment 16 and controls 18 for the radio/cassette player 14. A clip 20 fixed to the rear face 22 of the housing 12 enables the housing to be attached to the user's clothing, for example to a belt. The base unit 10 thus far is the same as the base unit of a conventional personal stereo. However, instead of flexible leads connecting it to the earphones 30 and 40, the base unit 10 has an output terminal 24 attached to the outer face of the clip 20. The terminal is positioned so that when the base unit 10 is attached to the user's clothing by the clip 20 the terminal 24 is in contact with, or in close proximity to, the user's body.

The circuitry of the radio/CD/cassette player is arranged to supply to the terminal 24 electrical signals at carrier frequencies which allow the signals to be transmitted through the user's body. Two signals at different carrier frequencies are used, to carry left and right stereo signals to the earphones 30 and 40. The carrier frequencies may be, for example, 2.5 MHz and 3.0 MHz.

Alternatively, other ways of encoding the left and right signals could be used.

Any suitable arrangement for the earphone may be used. In one particularly preferred arrangement the earphone 30 has a casing 32 shaped so that it can fit into the user's ear, and is provided with a spring arm 34 to hold the earphone in position. The shapes of the earphone and clip may be similar to those of a conventional earphone. The earphone 30 includes a terminal 36 fixed to the casing 32 or spring arm 34, so that when the earphone is worn the terminal 36 is in contact with or in close proximity to the user's skin.

The earphone 30 includes receiving circuitry adapted to receive the signals transmitted by the base unit 10 and picked up by the terminal 36, and to drive a transducer in the casing 32, so as to generate sound corresponding to the left channel signal transmitted by the base unit. The casing 32 also houses a suitable battery to power the circuitry.

The right earphone 40 is constructed in the same way as the left earphone 30, having a casing 42 with a spring arm 44 and terminal 46. The receiving circuitry of the right earphone 40 is arranged to drive a transducer in the casing 42 to generate sound corresponding to the right channel signal transmitted by the base unit 10.

It will be appreciated that modifications may be made in the described embodiment. For example, instead of providing a separate terminal on the earphones, the casing of each earphone could be made of an electrically conductive plastics material, and the casing itself used as the earphone terminal.

Figure 3:
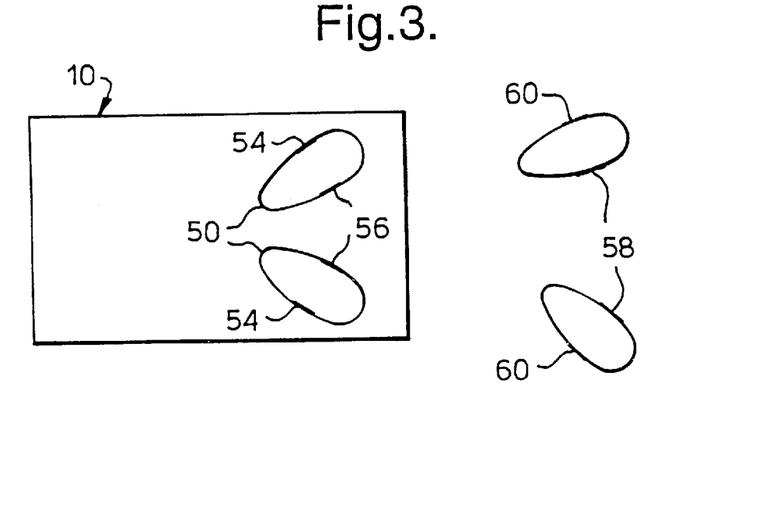
FIGS. 3 and 4 show further embodiments of the invention.

As illustrated in FIG. 3, cavities 50 may be provided in the base unit 10 in which earphones 52 may be stowed when not in use. The cavities correspond to the shape of the earphones, and may be provided with contacts 54,56 which connect with corresponding contacts 58,60 on the earphones. By this means, when the earphones are stowed, their internal batteries may be charged from the battery contained in the base unit. One of the contacts 58,60 may double as the terminal 36 already described.

The terminal on the base unit could take different forms. For example, the terminal could be provided on a flexible strap attached at one end to the housing and arranged so that it can be tucked into the user's clothes to make contact with the skin. Alternatively, the housing could be made of conductive plastics material and used itself as the terminal.

Figure 4:
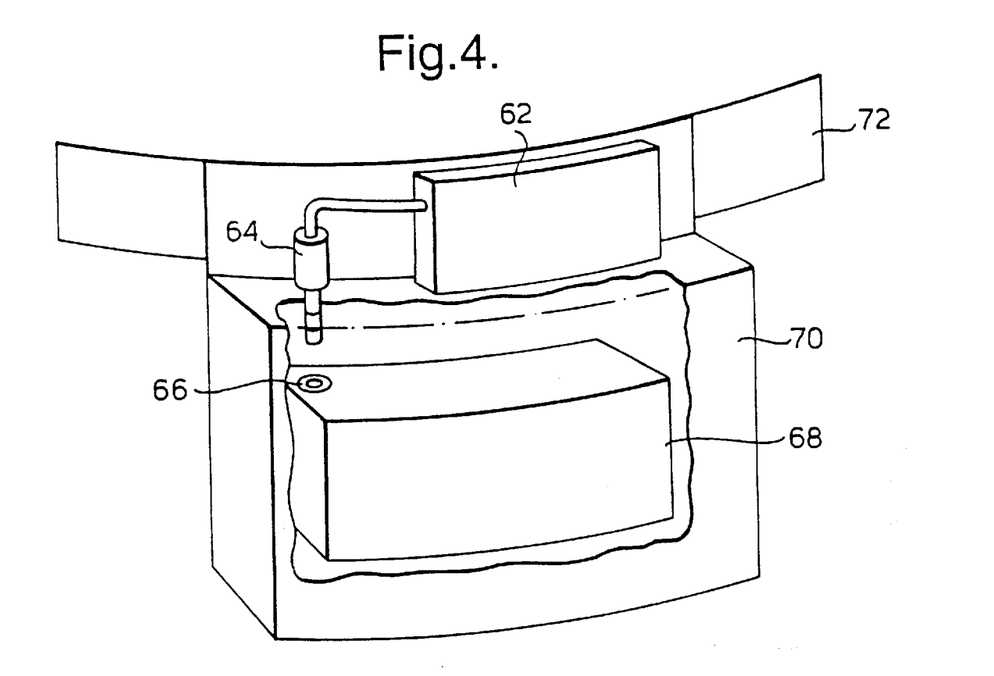

FIG. 4 shows a further form of the base unit, this time in the form of an adapter for modifying an existing personal stereo apparatus. The adapter 62 comprises a connector (eg. a jack) 64 to fit the earphone socket 66 of a conventional personal stereo apparatus 68. The adapter thereby receives the audio output of the personal stereo.

The adapter may be situated in a wall of a pouch or pocket 70 (shown partially cutaway) attached to a belt 72 to be worn by the user. At least part of the inwardly-facing surface of the belt is conductive, such that a terminal equivalent to terminal 24 of FIG. 1 for transmitting signals into the user's body is formed. In use, the personal stereo is placed in the pocket 70 and connected to the adapter 62. The audio output is processed as previously described in the context of FIGS. 1 and 2 and transmitted through the user's body to the earphones.

The adapter 62 may be provided with storage cavities as in FIG. 3, in which case power for the adapter is provided by an internal battery. It will be appreciated that the pouch or pocket 70 can equally be provided as part of a rucksack, handbag or shoulder bag, the handle or strap in each case containing the transmitting terminal. Indeed, the pouch or pocket can be embodied in clothing or a fashion or sports accessory which is worn or carried.

The earphones could be provided in other forms, for example in any of the styles in which conventional earphones are provided. The earphones could be incorporated into the arms of a pair of spectacles. Instead of providing batteries for the earphones, they could be powered by solar cells. For example, if the earphones are connected to a structure, as in a conventional headset, on the frame of a pair of spectacles, a single array of solar cells could be mounted in a suitable position on the structure and connected by wiring to the earphones.

The spectacles according to the above first aspect will now be described with reference to FIGS. 5 or 9. The spectacles preferably comprise lenses 101 located within a frame 102. An arm 103 extends from each side of the frame 102. The arm is preferably of the conventional shape and therefore has a curved portion 104 adapted to be placed behind the ear to allow the spectacles to be worn in a conventional manner, i.e with the frame resting on the bridge of the wearer's nose and the ear end of the arm being located behind the wearer's ear. Located at the ear end of the arm is an earphone 105 which is located in a recess 106 in the arm 104. The recess 106 may, in one alternative arrangement, be located on the outer surface of the ear end of the arm. In another alternative arrangement the earphone is located on a pin at the end of the arm.

Figure 8:
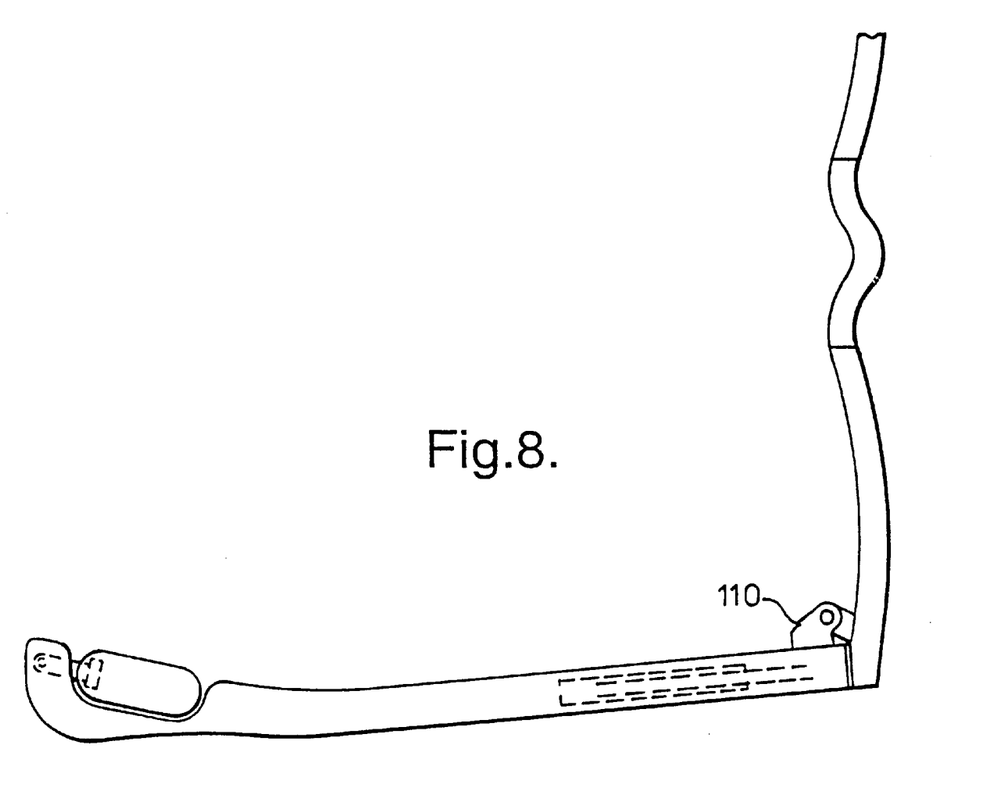
FIG. 8 is a fragmentary plan view of the spectacles of FIG. 5.

As can be seen from FIG. 8, the arms may be attached to the frame by means of a hinge 10 such that the spectacles may be folded for storage in the conventional manner.

The spectacles have adjusting means which enable the ear end of the arms of the spectacles to be moved from the conventional position in which the ear end, and thus the earphone, is located behind the ear to a listening position in which the ear end of the arm is located across the ear and the earphone is located in, or adjacent to, the ear.

The arms of the spectacles may be formed such that they have some inherent elasticity to facilitate movement of the arms from the conventional position to the listening position.

Figures 5, 6:
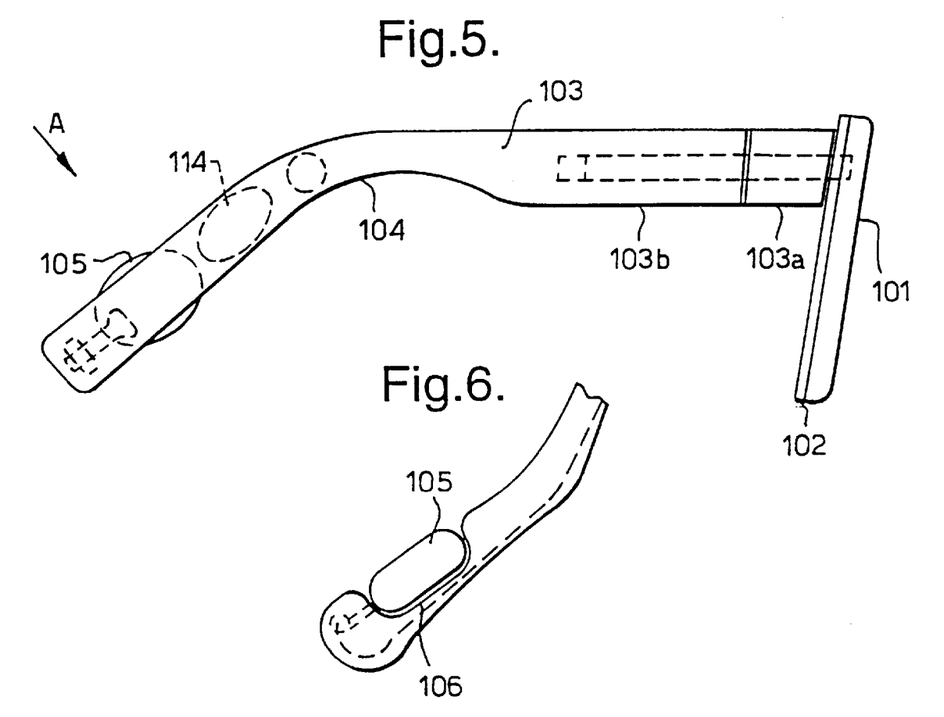
FIG. 5 is a side elevation of spectacles according to the invention.
FIG. 6 is a fragmentary view of part of an arm and earphone of the spectacles, viewed from "A" in FIG. 5.
Figure 7:
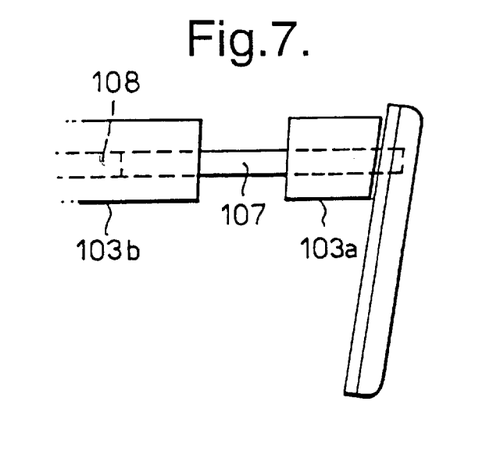
FIG. 7 is a fragmentary elevation of the spectacles of FIG. 5 showing an arm in the extended position.
Figure 9:
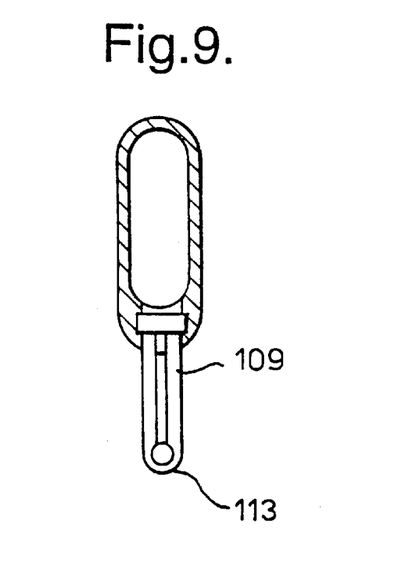
FIG. 9 is an enlarged cross-sectional view of an earphone of the spectacles.

In the embodiments illustrated in FIGS. 5 or 9, the adjusting means comprises means by which each of the arms is adjustable in length. As shown in FIG. 7, one arrangement of the adjusting means is where the arm is divided into two portions, 103*a* and 103*b*. A pin 107 fixed to the front portion 103*a* is slidable in a bore 108 in the rear portion 103*b*. The pin and the co-operating bore are preferably curved upwardly such that when the arm is in the position shown in FIG. 7, ie. in the extended position, the recess 104 will sit comfortably behind the ear of the wearer and when the rear portion is moved forwardly along the pin such that portion 103*b* abuts portion 103*a*, the ear end of the arm is located across the ear and the earphone is located adjacent to, or in, the ear. Thus, as the rear portion of the arm is moved towards the front portion, the inclination of the rear portion changes.

Figure 14:
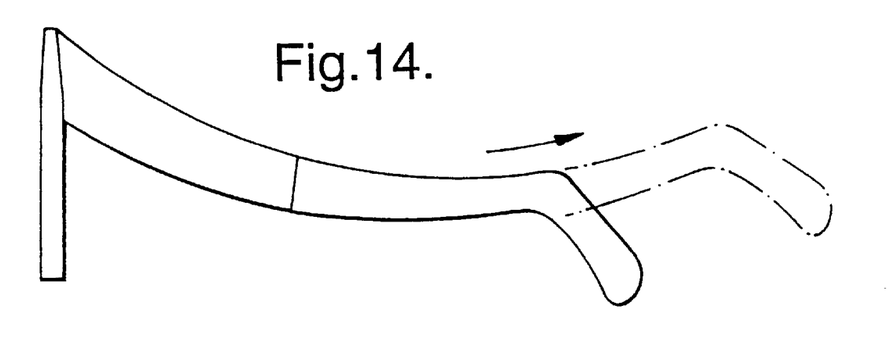
FIGS. 14 and 15 show a side elevation of spectacles according to a further embodiment of the present invention.

In a particularly preferred embodiment the arms are configured such that as they move from the contracted position to the extended position the ear end of the arm transcribes an upwardly extending arc as illustrated in FIG. 14.

Figure 15:
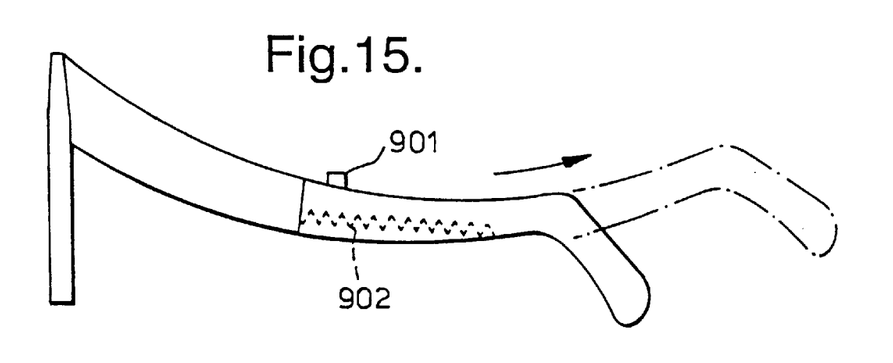

Whatever configuration is used for the arms of the spectacles, the movement from the contracted to the expanded position may be sprung loaded. In this arrangement a release catch 901 may extend from the arm which when depressed releases the spring 902 which causes the arm to move to its extended configuration. The spring mechanism is illustrated in FIG. 15 with reference to the arm arrangement of FIG. 14. It will be understood that the spring loaded arrangement may be incorporated into other possible configurations for the arms.

Whatever or not the arms are sprung loaded, a projection may extend from the ear end of the arms such that movement of the arm from the extended to the contracted position could readily be achieved by the user holding the projection with, for example, the thumb and whilst holding the frame in his fingers moving the thumb towards the fingers.

Figure 11:
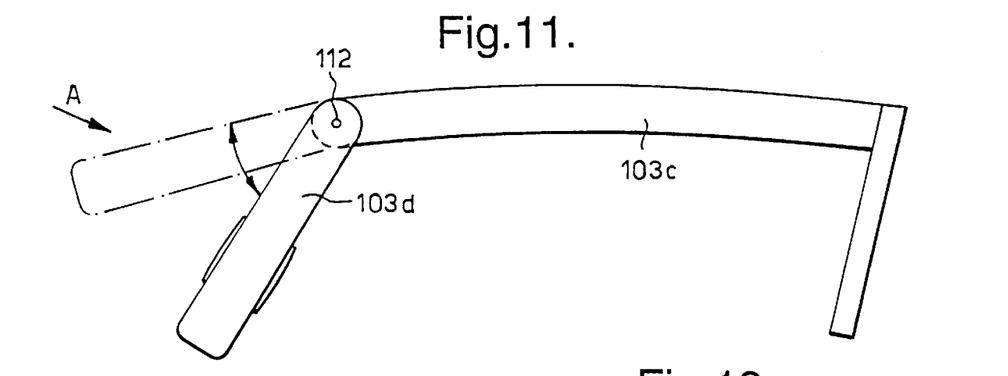
FIG. 11 is a side elevation of spectacles according to a further embodiment of the present invention.
Figure 12:
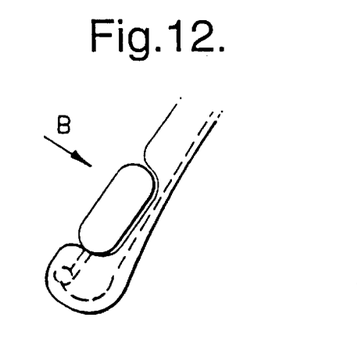
FIG. 12 is a fragmentary view of part of an arm and earphone of the spectacles, viewed from "A" in FIG. 11.
Figure 13:
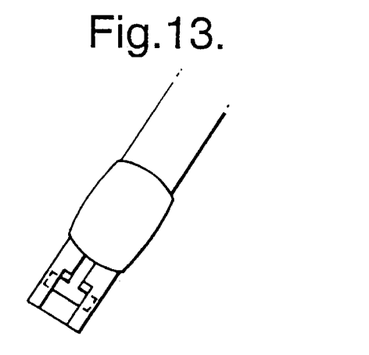
FIG. 13 is a fragmentary view of part of an arm and earphone of the spectacles, viewed from "B" in FIG. 12.

In an alternative embodiment illustrated in FIGS. 11 to 13, the arm is formed from two parts, a first part 103c and a second part 103d. The first and second parts are connected together by means of a pin 112 such that the second part is rotatable about the pin. The ear end of the arm may then be adjusted from a first position in which the first and second parts are collinear and in which the ear end of the arm sits comfortably behind the ear of the wearer to a second position in which the second part is angled from the first part and in which the ear end of the arm is located across the ear and the earphone is located in, or adjacent to, the ear by pivoting the second part 103d about the pin 112.

Figure 17A:
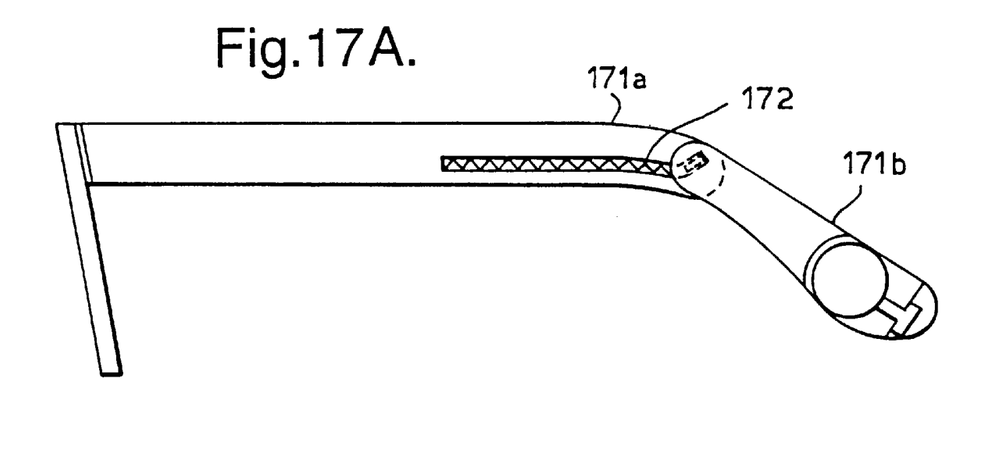
FIGS. 17A and 17B are side elevations of spectacles according to a still further embodiment of the present invention.
Figure 17B:
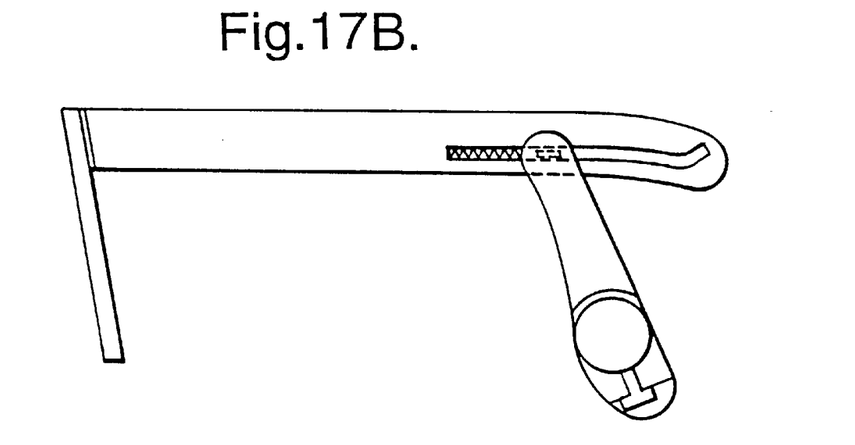

In a preferred embodiment illustrated in FIG. 17, the first 171a and second 171b parts are connected by a pin (not shown) extending from the second part which is slidable in a channel 172 in the first part. The channel is preferably curved upwardly at the end remote from the frame of the spectacles. The movement from the contracted position (FIG. 17B) to the extended position (FIG. 17A) is preferably sprung loaded. A release catch may be located in any covenant position.

Figure 10:
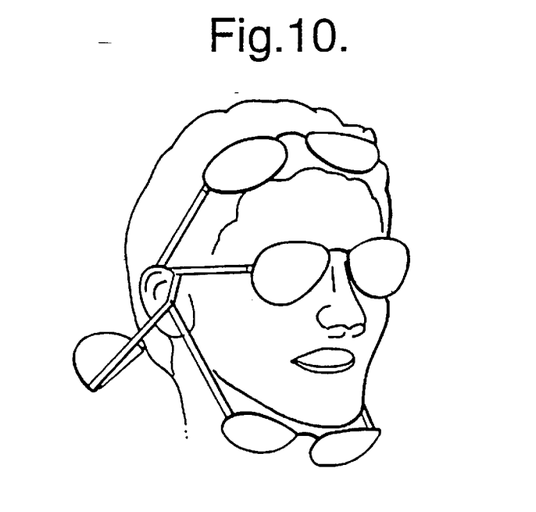
FIG. 10 is a diagrammatical illustration of some of the various positions in which the spectacles may be worn.
Figure 16:
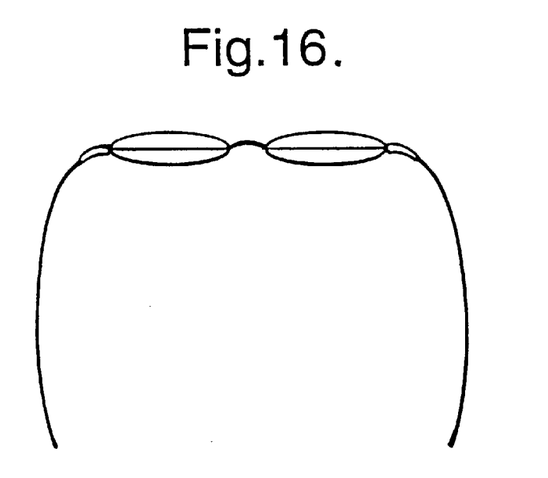
FIG. 16 is a plan view from above of a preferred embodiment of the invention.

If the earphone is to be located in the ear it is preferably pivotable from a position in which it is coplanar with the arm, for example extending from the end of the arm or located in a recess 106 to a position in which it is angled to the arm. The earphone is preferably angled at 90° to the arm. As shown in FIG. 9, the earphone may be mounted on a pin 109 pivotable at a point 113 to the arm. The earphone is also rotatable about the axis of the pin, so that the spectacles may be worn in a variety of positions on the head with the earphones remaining in the correct orientation within the ear. A selection of suitable positions together with some positions in which the spectacles are being worn in the conventional manner are illustrated in FIG. 10. Thus, the spectacles may be worn on the nose or on the head with the ear end of the arm located behind the ear or, they may be worn on the nose, on the head, behind the head or even under the chin with the earphones located in, or adjacent to, the ear. The arms of the spectacles are preferably curved in a convex manner to accommodate the wearer's head as illustrated in FIG. 16. This enables the spectacles to be readily moved between the positions. The spectacles may be adapted such that the rotation of the earphone from the storage position in the manner described acts as a switch to activate the earphones.

Figure 18:
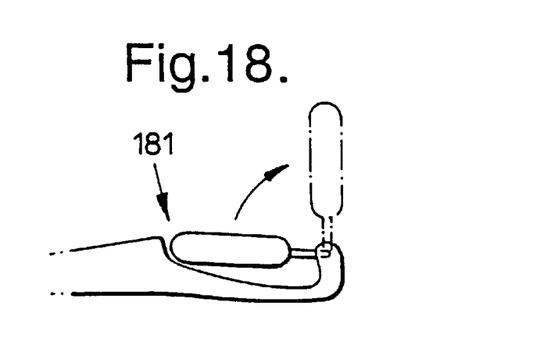
FIG. 18 is a fragmentary view of part of an arm and earphone of the spectacles.

As illustrated in FIG. 18, the earphone may be sprung loaded such that on release of a catch the earphones move to the listening position. Upon release of the catch the earphones preferably also rotate about the pin 109 to the vertical position.

Additionally or alternatively, the action of moving the arm form the expanded to the contracted position, may release the earpieces to the listening position.

The arms of the spectacles may contain suitable electrical circuitry to convert an electrical signal received from one or two leads (not shown) from a base unit (not shown) to an audio signal. Where the electrical signal is received from one lead, the spectacles will include integral wires connecting the earphones to the lead. The signal may be introduced into the spectacles by means of one or two suitable socket(s).

When the base unit is of the kind described with reference to the first to third embodiments of the present invention the spectacles additionally comprise one or two terminal(s) 114 arranged so that they can be positioned in use in contact with, or in close proximity to, the user's body so as to receive signals transmitted from the housing terminal through the user's body, and the or each earphone includes receiving circuitry arranged to receive the signals from the base unit. The terminal may therefore advantageously be located on the inner surface of the ear end of the arm. Where the spectacles include one terminal, the spectacles will include integral wires connecting the earphones to the terminal.

Additionally or alternatively, the spectacles may include integral audio apparatus, such as, for example, a radio receiver or other sound source, including a solid state sound source. In this case, the spectacles will also include appropriate circuitry to convert the signals to audio signals and transmit them to the earphones.

The spectacles may alternatively be adapted to receive any other method of providing signals to the earphones, for example signals transmitted in the infra-red portion of the electromagnetic spectrum.

The spectacles of the present invention may be modified in a variety of ways. For example, the spectacles may incorporate controls and/or switches to enable the user to control the volume level of the sound. Other parameters may also be controlled.

Means may be incorporated between the arms of the spectacles and the earphones to reduce acoustic noise. In one preferred embodiment the means are mounts formed from a resilient material such as rubber.

The spectacles have been described with reference to their proposed use with portable audio apparatus. However, it will be appreciated that the spectacles would be advantageous in a variety of fields. For example, if a microphone is incorporated in the spectacles, for example, at the base of the lenses, the spectacles would be useful as part of a hands-free telephone, or as any type of communication device, such as may be used in television studios or in security operations.

The spectacles of the present invention are also suitable for use as a hearing aid device, particularly a directionally sensitive hearing aid device. Such a system would be particularly advantageous to a person who has difficulty with background noise.

If a power source, for example a solar cell or battery is incorporated in the spectacles, this could be utilised to enable the wearer to control the darkness of the lenses. In this case, the lenses would include a liquid crystal or other means of achieving a darkening of the lens. This power could also be used to generate a head up display on the interior of the lenses which could operate in conjunction with the signal transmitted from the base unit. Similarly, the lenses may include displays for games or other purposes.

Figures 19, 20:
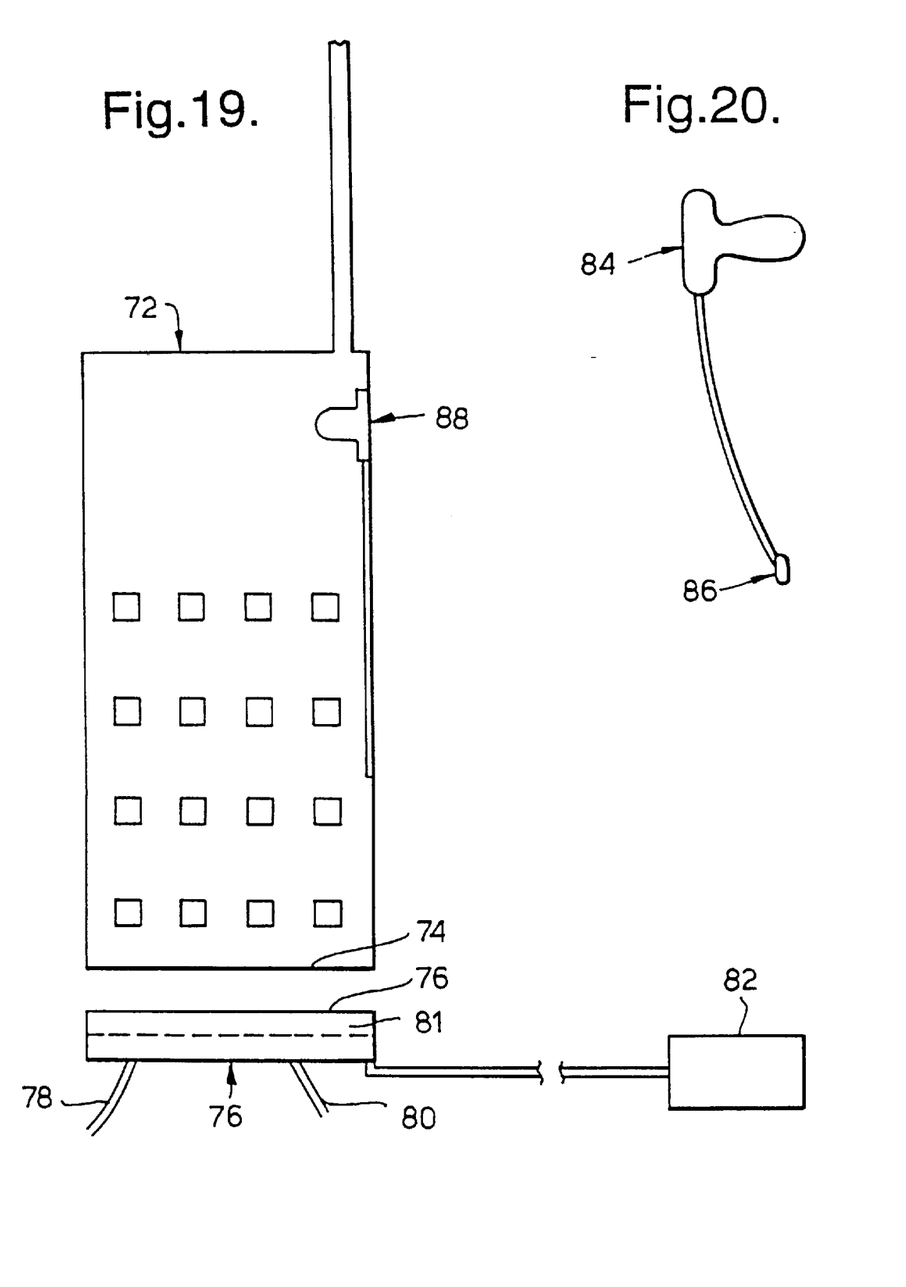
FIGS. 19 and 20 show a further embodiment of the invention.

FIGS. 19 and 20 illustrate a mobile telephone which makes use of the invention to provide a safe hands-free mode of operation for in-car use. aThe mobile telephone 72 is provided with a connector 74 on its bottom edge which is received by a complementary connector 75 in a storage device or base unit 76 which is mounted in the vehicle convenient to the driver. In addition to he conventional connections 78, 80 to the car electrical system and to a transmit/receive antenna, the base unit also contains an adaptor 81 similar to 62 of FIG. 4. This is connected to an antenna or terminal 82 in the driver's seat. The earphone and microphone circuits of the telephone 72 are connected via the connectors 74, 75 to the base unit 76. An earphone 84 similar to that of FIG. 3 with a microphone 86 attached, receives and transmits signals from and to the base unit via the driver's body and the seat antenna 82. The driver may thus conduct a safe hands-free conversation whilst driving. The telephone is provided with a storage means 88 as in FIG. 3 to house the earphone/microphone headset 84, 86 when not in use and to recharge it.

The mobile telephone of this embodiment has the advantage that background noise and feedback are reduced.

As an alternative to providing the signal conversion circuitry in the base unit 76, it can be provided in the telephone 72 itself. Then the base unit 76 need be only a simple connector and furthermore the casing of the telephone 72 can be provided with an additional antenna or terminal similar to 24 of FIG. 1 so that the headset 84, 86 can be used with the telephone in the user's pocket, or merely carried rather than held to the head. Locating the headset in these positions overcomes any problems associated with locating a transmitter adjacent to the head.

Figure 21:
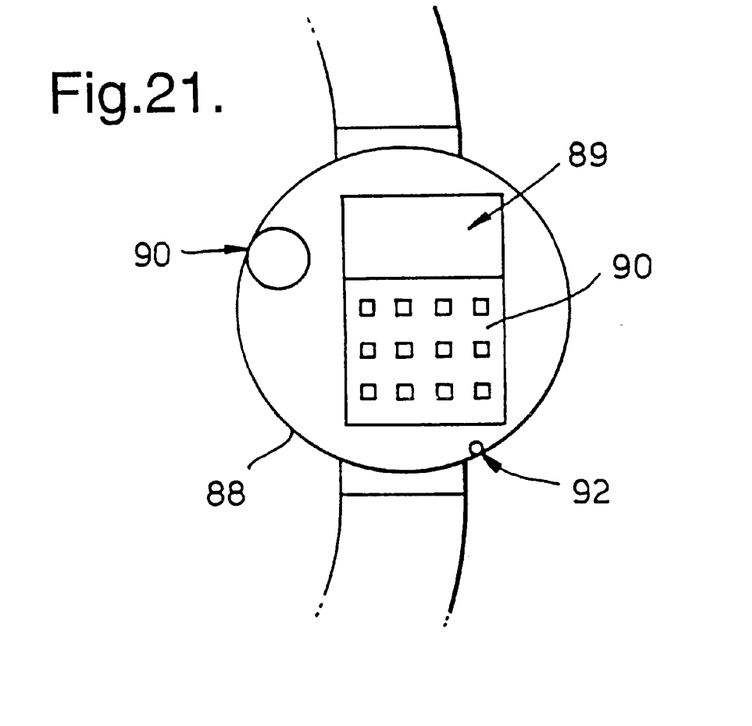
FIGS. 21 and 22 each show additional embodiments of the invention.

Referring to FIG. 21, a wristwatch provides a particularly convenient means of implementing the invention, because good contact can be achieved with the wearer's body via an antenna or terminal on the inside of the strap or the back of the case.

Thus a wristwatch has a case 88 with a display 89, preferably an LCD display, (normally showing the time) and keypad 90 on the front, and a body-contact terminal or antenna on the back. A removable earphone 91 similar to that of FIG. 3 may be stowed in the body of the watch, together with a microphone 92. As illustrated the wristwatch is configured as a mobile telephone or radio system, eg. for use within a building, but equally or in addition, can embody a broadcast radio receiver or other small sized sound source.

Figure 22:
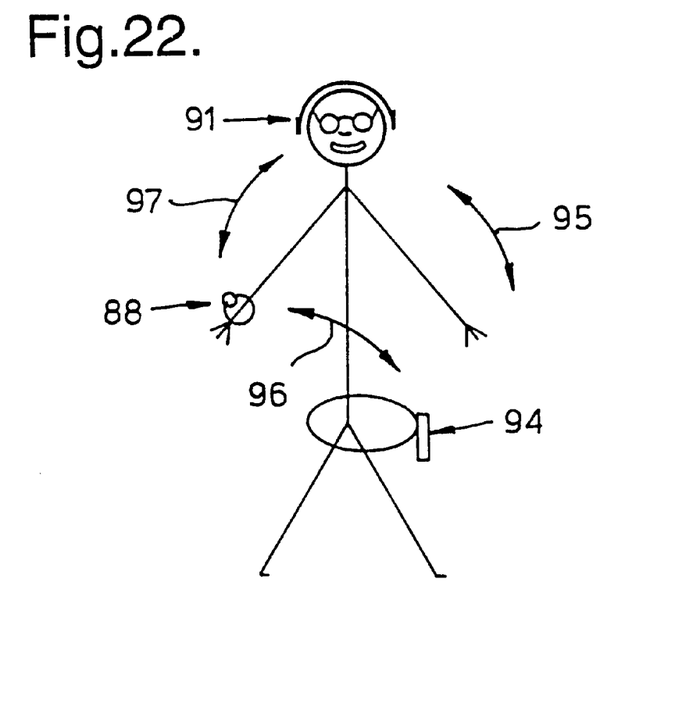

If greater battery power is required, the batteries and the power-consuming circuits can be provided in a separate unit 94 as shown in FIG. 22, only the controls being provided in the wristwatch. Then through-body communication is provided between all three parts of the system 88,91,94 by employing three or more carrier frequencies so that any two of the units can communicate without interference from the other, as illustrated diagrammatically by arrow, 95,96,97.

The watch may have data input and/or storage facilities. Data may be readily transferred from the watch to a computer having as an integral part, or as an accessory, a terminal that enables contact to the body. Data can then be transferred without removing the watch from the wrist and without cables and connectors.

Each feature disclosed in this specification (which term includes the claims) and/or shown in the drawings may be incorporated in the invention independently of other disclosed and/or illustrated features.

I claim:

1. A method for producing sound, comprising the steps of:
    providing a base unit having a signal output portion adapted to be positioned in use in contact with or in close proximity to the surface of a user's body, and a reception unit for mounting adjacent the user's ear(s),
    locating the signal output portion in contact with or in close proximity to the surface of the user's body,
    applying a radio-frequency signal, modulated with an audio signal, to the signal output portion of the base unit,
    transmitting the radio-frequency signal from the signal output portion into the user's body,
    locating the reception unit in contact with or in close proximity to the user's head,
    receiving the radio-frequency signal from the base unit at the reception unit after transmission substantially solely through the user's body,
    demodulating the received signal with the reception unit to extract the audio signal therefrom, and
    generating sound adjacent the user's ear(s) from the audio signal.

2. An apparatus for producing sound, said apparatus comprising:
    a base unit including:
        a signal output portion adapted to be positioned in contact with or in close proximity to the surface of a user's body;
        means for modulating a radio-frequency signal with an audio signal; and
        means for transmitting the radio-frequency signal substantially solely through the user's body via the signal output portion to a reception unit;
    and the reception unit including:
        receiving means to be placed in contact with or in close proximity to the user's head for receiving the radio-frequency signal transmitted through the user's body,
        means connected to the receiving means for demodulating the received signal to extract the audio signal therefrom, and
        an electrical-to-audio transducer connected to the demodulating means for generating sound from the audio signal.

3. The apparatus for producing sound according to claim 2, in which the signal output portion is provided on a housing of the base unit.

4. The apparatus for producing sound according to claim 2, in which the reception unit comprises an earphone.

5. The apparatus for producing sound according to claim 2, wherein the reception unit includes left and right earphones, and in which the circuitry in the base unit is arranged to transmit left and right stereo signals suitably encoded for reception by the left and right earphones.

6. The apparatus for producing sound according to claim 5, in which each earphone includes a separate power storage device to power the earphone.

7. The apparatus for producing sound according to claim 6, in which the power storage device comprises a battery or a capacitor.

8. The apparatus for producing sound according to claim 6, in which the power storage device comprises a solar cell.

9. Apparatus for producing sound according to claim 8, in which the base unit includes means for recharging the power storage device.

10. Apparatus for producing sound according to claim 9, in which the base unit has means for stowing the or each earphone when not in use, and in which the stowing means includes electrical connectors for connecting the power storage device to the recharging means.

11. The apparatus for producing sound according to claim 7, in which the base unit includes means for recharging the power storage device.

12. The apparatus for producing sound according to claim 11, in which the base unit has means for stowing each earphone when not in use and in which the stowing means includes electrical connectors for connecting the power storage device to the recharging means.

13. The apparatus for producing sound according to claim 12, in which each earphone has a casing comprising electrically conductive material which acts as an earphone terminal.

14. The apparatus for producing sound according to claim 2, in which the base unit is provided with a clip for releasable attachment to the user's clothing, and the signal output portion is formed by the clip.

15. The apparatus for producing sound according to claim 2, in which the base unit is adapted to be attached to a personal stereo apparatus or other apparatus as a source of signals, the base unit including circuitry adapted to receive signals from circuitry of the signal source apparatus.

16. The apparatus for producing sound according to claim 2, in which the base unit is adapted for installation in a vehicle, and means are provided to connect the base unit to the vehicle whereby a part thereof is in contact with or is proximate the user's body and forms the signal output portion.

17. The apparatus for producing sound according to claim 2, in which the base unit is a mobile telephone.

18. Apparatus for producing sound according to claim 2, in which the reception unit includes a switch to turn off reception unit circuitry or place the circuitry in a quiescent state when the reception unit is not in use.

19. Apparatus for producing sound according to claim 2, in which the base unit includes a tape player, and/or a CD player, and/or a radio receiver.

20. Apparatus for producing sound according to claim 2, in which the reception unit includes means for transmitting signals substantially solely through the user's body to the base unit.

21. Apparatus for producing sound according to claim 20, in which the reception unit is provided with a microphone to transmit audio signals substantially solely through the user's body to the base unit.

22. Apparatus for producing sound according to claim 20, in which the reception unit is adapted to transmit control signals substantially solely through the user's body to the base unit.

23. An apparatus for producing sound, said apparatus comprising:
 a base unit including:
  a signal output portion adapted to be positioned in contact with or in close proximity to the surface of a user's body;
  means for applying a radio-frequency signal, modulated with an audio signal, to the signal output portion for transmission substantially solely through the user's body to a reception unit via the signal output portion;
 and the reception unit comprising at least one earphone, said earphone including:
  a casing;
  a terminal fixed to the casing so that when the earphone is worn the terminal is in contact with or in close proximity to the user's skin;
  receiving circuitry adapted to receive the radio-frequency signals from the base unit via the terminal;
  means connected to the receiving means for demodulating the received signal to extract the audio signal therefrom;
  a transducer connected to the demodulating means for generating sound from the audio signal; and
  a battery to power said earphone.

24. An apparatus for producing sound according to claim 23, wherein said reception unit includes a second earphone, separate and unconnected to the first earphone, for insertion into a second ear of the user's body.

25. An apparatus for producing sound according to claim 23, wherein said signal output portion comprises an antenna in a driver's seat of a vehicle.

26. An apparatus for producing sound according to claim 23, wherein said signal output portion comprises an antenna mounted in a clip of said base unit.

27. An apparatus for producing sound according to claim 23, wherein said base unit includes an adaptor for modifying a personal stereo device, said personal stereo device comprising said means for modulating a radio-frequency signal with an audio signal of said base unit, and said signal output portion comprising a conductive inwardly Lacing surface of a belt supporting said adapter and a pouch containing said personal stereo device.

* * * * *